United States Patent
Giefer et al.

(10) Patent No.: US 6,601,469 B1
(45) Date of Patent: Aug. 5, 2003

(54) SHIFTING DEVICE COMPRISING A GEARSHIFT LEVER FOR AN AUTOMATIC TRANSMISSION OF A MOTOR VEHICLE

(75) Inventors: Andreas Giefer, Lemförde (DE); Jörg Meyer, Wagenfeld (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/857,549
(22) PCT Filed: Oct. 20, 2000
(86) PCT No.: PCT/DE00/03702
§ 371 (c)(1), (2), (4) Date: Jun. 6, 2001
(87) PCT Pub. No.: WO01/29453
PCT Pub. Date: Apr. 26, 2001

(30) Foreign Application Priority Data

Oct. 20, 1999 (DE) .......................... 199 50 638

(51) Int. Cl.⁷ .......................... G05G 5/08; B60K 20/02
(52) U.S. Cl. .......................... 74/537; 74/473.3
(58) Field of Search .......................... 74/473.3, 473.21, 74/473.26, 473.28, 537, 538

(56) References Cited

U.S. PATENT DOCUMENTS

| | | | | |
|---|---|---|---|---|
| 4,133,223 A | * | 1/1979 | Prince | .......................... 74/538 |
| 4,774,850 A | * | 10/1988 | Shovlin | .................... 74/473.23 |
| 5,575,174 A | * | 11/1996 | Kanematsu et al. | .......... 74/538 |
| 5,577,418 A | | 11/1996 | Traxler et al. | ................. 74/528 |
| 5,617,760 A | * | 4/1997 | Woeste et al. | ................. 74/538 |
| 5,862,708 A | | 1/1999 | Shamoto | .................... 74/473.18 |
| 6,189,398 B1 | * | 2/2001 | Kataumi et al. | ............... 74/538 |

FOREIGN PATENT DOCUMENTS

| | | |
|---|---|---|
| DE | 295 18 788 U1 | 2/1996 |
| DE | 195 13 809 C1 | 10/1996 |
| DE | 198 29 173 A1 | 1/2000 |
| EP | 311481 A1 * | 4/1989 |
| JP | 2-31076 | 2/1990 |

* cited by examiner

Primary Examiner—Chong H. Kim
(74) Attorney, Agent, or Firm—McGlew and Tuttle, P.C.

(57) ABSTRACT

A shifting device with a gearshift lever for an automatic transmission of a motor vehicle is provided with an unlocking mechanism for unlocking the gearshift lever with a manual actuating element. The gearshift lever can be moved, in at least one shift gate, between two different shift positions and can be locked at least partially in these shift positions as a function of different vehicle configurations. A spring-tensioned force transmission element is provided in the unlocking mechanism.

16 Claims, 2 Drawing Sheets

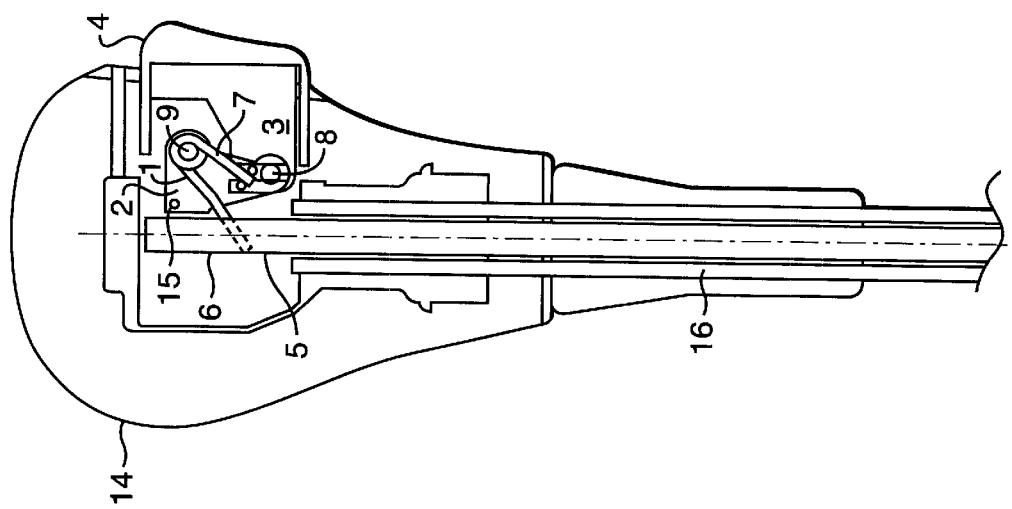
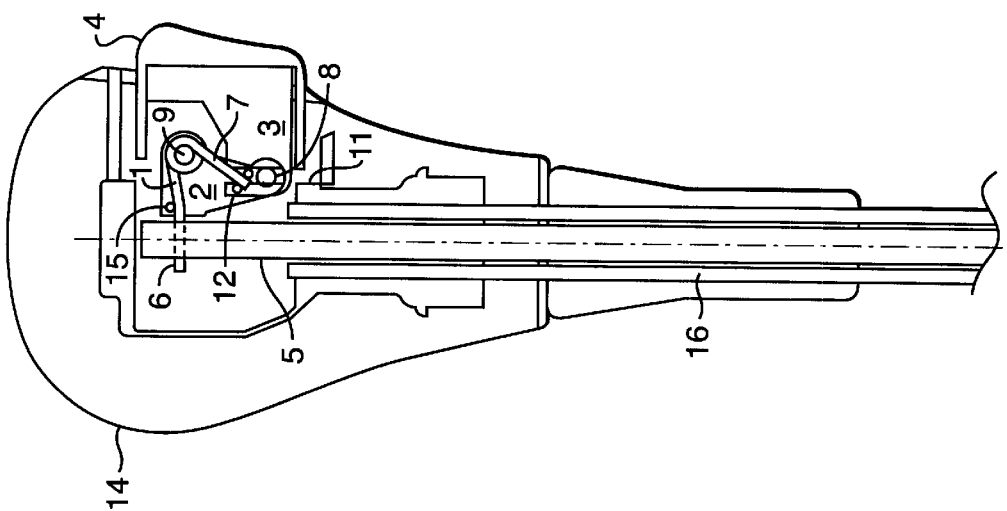
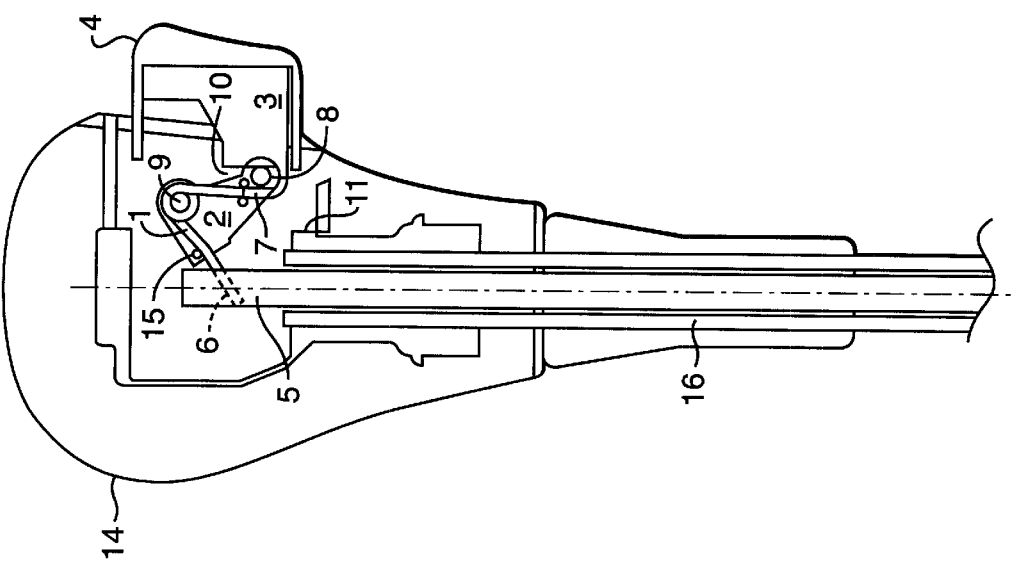

SHIFTING DEVICE COMPRISING A GEARSHIFT LEVER FOR AN AUTOMATIC TRANSMISSION OF A MOTOR VEHICLE

The present invention pertains to a shifting device with a gearshift lever for an automatic transmission of a motor vehicle with an unlocking mechanism for unlocking the gearshift lever with a manual actuating element, wherein the gearshift lever is movable in at least one shift gate between at least two different shift positions and can be locked in these shift positions at least partially as a function of different vehicle configurations.

Such shifting devices with gearshift levers are used in automatic transmissions for motor vehicles, and such automatic transmissions usually have at least one automatic gate, in which the gearshift lever can be shifted between the positions "P" for park position, "R" for reverse, "N" for a neutral position, which brings about the uncoupling of the transmission from the vehicle, and "D" for travel in the forward direction with gears shifted automatically. Additional shift positions are also provided in most cases in addition to the "D" position in order to select different transmission programs. In addition, there is also a Tiptronic gate in some cases, in which the gears of the transmission can be selected manually.

In order not to move the gearshift lever accidentally and thus to avoid either damage to the vehicle or another danger, a manual actuating element in the form of, e.g., an unlocking knob is arranged in most prior-art gearshift levers, by which knob an intentional unlocking of the shifting device is performed, so that, e.g., the gearshift lever can be shifted from position "P" to position "R." Incorrect conditions [sic—typo in German original for word meaning "operating error"—Tr.Ed.], which could unintentionally lead to the destruction of the transmission, e.g., due to putting in the reverse at a high forward speed, are also avoided correspondingly.

One example of such a shifting device with a gearshift lever for an automatic transmission of a motor vehicle has been known from the applicant's German Patent Specification DE 195 13 809 C1. This patent specification discloses a gearshift lever, with a knob arranged at the top end of the gearshift lever, a locking bar guided axially at the gearshift lever and a displaceable unlocking knob, which can be actuated manually and by means of which the locking bar can be raised by reversing the force by pushing in the unlocking knob and which thus eliminates the locking of the gearshift lever.

Another similar shifting device with a gearshift lever for an automatic transmission is shown in the applicant's yet unpublished patent application DE 198 29 173. This gearshift lever likewise has a knob at the top end, an axially guided locking bar and a locking knob that can be moved by hand for actuating the locking bar. The transmission of forces between the locking knob and the locking bar takes place via fixed teeth on an elliptical contour, so that a favorable course of the manual forces is obtained during the actuation of the unlocking knob.

To avoid operating errors of the vehicle, modern shifting devices have a system for blocking the unlocking mechanism of the gearshift lever in certain vehicle configurations, e.g., a so-called key lock system. For example, the parking brake shall be prevented with the key lock from being actuated without an ignition key. This means that the gearshift lever cannot be moved from its "P" position due to blocking of the unlocking mechanism until the ignition key is correspondingly inserted. Consequently, this system prevents the vehicle from rolling away unintentionally.

Such a system becomes problematic when the driver is not familiar with the function of the key lock system in conjunction with the automatic transmission and attempts to bring about the unlocking of the gearshift lever by applying a correspondingly strong force on the unlocking knob, even though the key lock system actually blocks the movement of the gearshift lever. If the unlocking knob is actuated forcibly to unlock the gearshift lever in such a situation despite the blocking of the unlocking knob, this usually leads to the destruction of one of the force-transmitting elements of the unlocking mechanism, as a result of which the ability of the shifting means to function may be at least compromised.

The object of the present invention is therefore to provide a shifting device with a gearshift lever for an automatic transmission of a motor vehicle in which the actuation of the manual actuating element to unlock the gearshift lever does not bring about any destruction in the gearshift lever and in the entire shifting device even when stronger forces are applied in the case of an intended locking of the gearshift lever.

The object of the present invention is accomplished by the features of claim 1. Embodiments are the subject of the subclaims.

The above-described destruction of the unlocking device of the gearshift lever or of parts thereof by misactuation can be avoided if the force transmission between the manual actuating element for unlocking the gearshift lever and the locking bar is designed such that in the case of an intended locking of the unlocking mechanism by a key lock system, actuation of the manual actuating element brings about only an inward deflection of a force transmission element beginning from a certain force applied, without all elements of the unlocking mechanism, especially an axial movement of the locking bar, having to be absolutely brought about [sic—Tr.Ed.]. At the same time, the force transmission between the manual actuating element and the locking bar shall have a sufficiently firm coupling, so that unlocking of the gearshift lever will take place due to the actuation of the manual actuating element in a permitted vehicle configuration.

It is correspondingly proposed that a shifting device with a gearshift lever for an automatic transmission of a motor vehicle with an unlocking mechanism for unlocking the gearshift lever with a manual actuating element, where the gearshift lever is movable in at least one shift gate between at least two different shift positions and can be locked at least partially in these shift positions as a function of different vehicle configurations, be improved such that a spring-tensioned force transmission element is provided in the unlocking mechanism.

Such a design of the shifting device advantageously causes that not all the forces that possibly occur at the manual actuating element will be passed through the unlocking mechanism, as a result of which it is also possible to make the mechanical parts lighter and thus less expensive.

The spring-tensioned force transmission element may preferably act as a force-transmitting connection member between the manual actuating element and the rest of the unlocking mechanism.

It is achieved as a result that even though the actuation of the manual actuating element leads to a movement of the unlocking mechanism in the normal case, the spring-tensioned element of the force transmission element undergoes an inward deflection in case of blocking of the unlocking mechanism, as a result of which only a movement of the manual actuating element, but no movement or rupture will occur in the unlocking mechanism, and destruction of the shifting device is thus avoided.

At least part of the unlocking mechanism may consist of a locking bar, which can be moved by the manual actuating element.

Such a spring-tensioned force transmission element may be arranged, e.g., pivotably around an axis, so that a movement of the manual actuating element approximately at right angles to the axis of the locking bar can bring about a simultaneous axial movement of the locking bar.

It is advantageous for the spring-tensioned force transmission element to have a spring support and a curved leg spring, which is braced thereon and is clamped in the pivoting direction on two sides at one of its legs and on one side at its other leg. This causes that during a movement of the force transmission element, the leg spring can be deformed beginning from a certain force without the existing kinematics being damaged.

To predefine a certain force beginning from which the spring-tensioned force transmission element prevents the movement of a locked locking bar without destruction, provisions may be made for the leg spring of the force transmission element to have a pretension, so that the feeling of the force coupling being too soft in the unlocking mechanism of the gearshift lever will not arise in normal operation during the actuation of the manual actuating element.

Provisions are made in a special embodiment of the force transmission element for the leg spring surrounding the pivot axis at least partially. Furthermore, the spring support itself is mounted pivotably.

The coupling of the forces between the spring-tensioned force transmission element and the manual actuating element can be brought about by embodying a pivotably and displaceably movable connection, preferably via the engagement of a pin or a roller on one of the two elements with a groove or an elongated hole on the respective other element.

For the force transmission between the spring-tensioned force transmission element and the locking bar, the locking bar may, furthermore, have a stop or an engagement, with which the spring-tensioned force transmission element, especially a leg of the leg spring, comes into contact or engagement.

It is obvious that a reverse design of the force transmission between the manual actuating element, especially an unlocking knob on a gear shift handle grip and the locking bar, can also be embodied without going beyond the scope of the present invention. It is also possible to use a coil spring instead of the leg spring described if the kinematics between the manual actuating element and the unlocking mechanism is correspondingly adapted.

For example, the locking bar or another force-transmitting element of the unlocking mechanism can be made spring-tensioned in the direction of its force transmission, so that a type of telescopic effect will occur beginning from a predetermined force and damage to the mechanical elements is avoided as a result of this as well. If, e.g., the locking bar of one of the prior-art shifting devices is modified such that it is made telescopically spring-tensioned, possibly with a coil spring between two telescope arms, the desired effect can also be achieved while maintaining the otherwise known shifting device.

Further features and advantages of the present invention will appear from the subclaims and the following description of a preferred exemplary embodiment with reference to the drawings.

Specifically,

FIG. 1 shows a section of a gearshift lever with a locking bar in the locked position, without actuation of the manual actuating element;

FIG. 2 shows a section of a gearshift lever with a locking bar in the unlocked position and with the manual actuating element actuated;

FIG. 3 shows a section of a gearshift lever with a locking bar in the locking position and with the manual actuating element in the misuse position.

Figure 4:
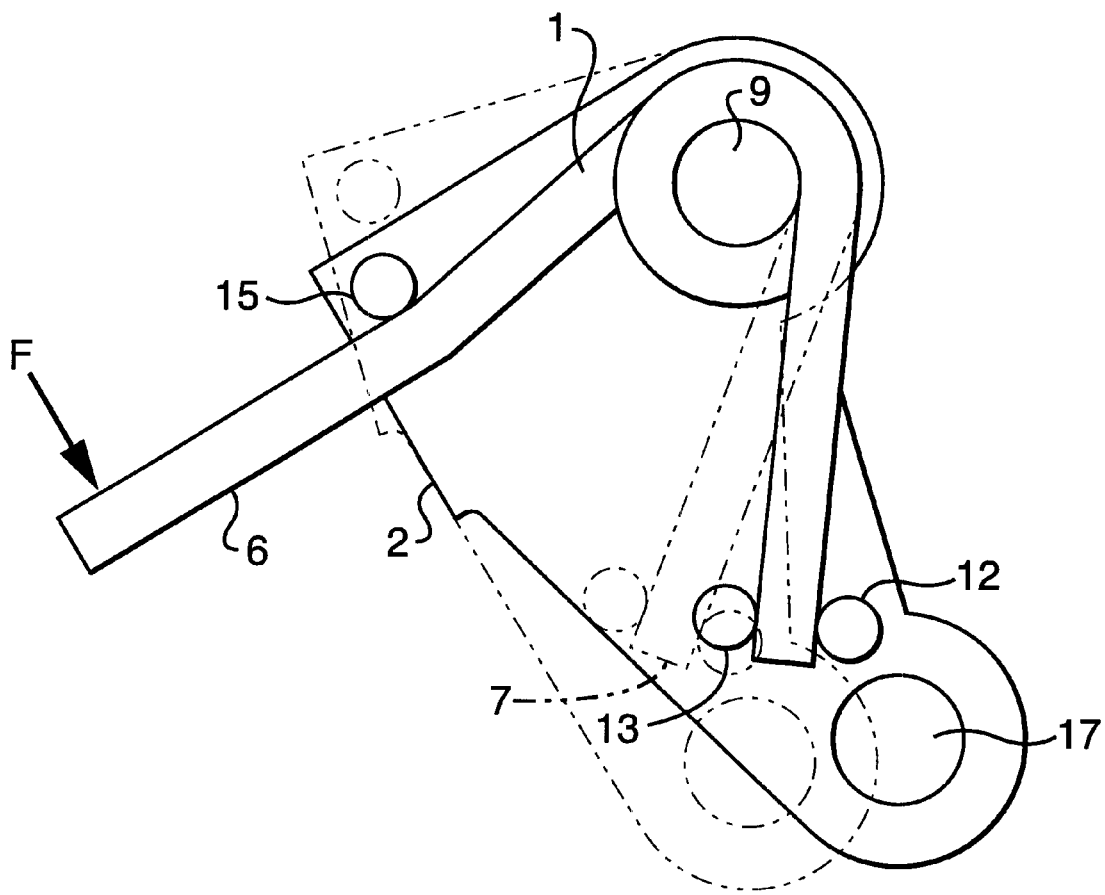
FIG. 4 shows the spring support with the leg spring.

FIG. 1 shows a section through a gearshift lever according to the present invention for an automatic transmission of a motor vehicle. The gearshift lever comprises a shifting tube 16, which is connected to the shifting kinematic of the shifting device itself, which is not shown here. A locking bar 5, which is part of the unlocking mechanism, is designed as a push/pull rod and must be raised for unlocking the gearshift lever for the movement of the gearshift lever from a defined shift position into another defined shift position, e.g., from "P" to "R," extends within the shifting tube 16. A shift knob 14, in which an unlocking knob displaceable at right angles to the longitudinal axis of the locking bar 5, is located at the upper end of the shifting tube 16. By pushing in the unlocking knob into the shift knob 14, a spring-tensioned force transmission element, which here comprises a spring support 2 and a leg spring 1 connected there, is deflected, and the second leg spring arm 7 brings about an axial movement of the locking bar 5.

The kinematic coupling between the unlocking knob 4 and the force transmission element with the spring support 2 and the leg spring 1 takes place via a groove 10 in a web 3 of the unlocking knob, which is engaged by a guide pin 8 of the spring support 2. A leg spring 1 with a first and second leg spring arm 6, 7 is located on the spring support 2. The first leg spring arm 6 on the knob side is clamped in at its end between a first and second spring stop 12, 13, so that any rotary movement of the spring support 2 around the axis 9 leads to a corresponding movement of the first leg spring arm 6. The second leg spring arm 7 is in contact with a third spring stop 15, and the entire leg spring 1 has a pretension, so that a fixed stopping of the second leg spring arm 7 at the third spring stop 15 is guaranteed. This one-sided stop for the second leg spring arm 7 offers the possibility that the second leg spring arm 7 can escape when an excessive pressure is applied opposite a clockwise rotary movement of the spring support 2, or if the locking bar 5 can be lifted by the spring force, the locking bar can be correspondingly lifted.

The position of the locking bar 5, the unlocking knob 4 and the spring-tensioned force transmission elements 1, 2, which position is shown in FIG. 1, corresponds to an inoperative position in which no actuation of the unlocking knob 4 and consequently no unlocking of the shifting device by the locking bar take place.

FIG. 2 shows a corresponding section through the gearshift lever as is known from FIG. 1, but the unlocking knob 4 is actuated in this view by the unlocking knob 4 being pushed into the shift knob 14 at right angles to the longitudinal axis of the locking bar 5. The spring support 2 is pivoted out around the axis 9 via the connection between the groove 10 and the guide pin 8, and the leg spring 1 with its two arms is pivoted as well and the locking bar 5 is deflected axially upward with the second leg spring arm 7 and it thus brings about the unlocking of the shift arm. This means that the spring force of the leg spring 1 is sufficient to bring about a reliable lifting of the locking bar and consequently a reliable actuation of the unlocking device.

If the locking bar 5 is locked in a locked position because of predefined vehicle configurations, e.g., when the ignition key is not turned, a powerful actuation of the unlocking knob 4 does not lead to the lifting of the locking bar 5 but only to the spring leg arms 6 and 7 coming closer, without the rest of the mechanism being damaged.

This situation of the unlocking knob 4 in the shift knob with simultaneous blocking of the locking bar 5 is shown in FIG. 3.

The spring-tensioned force transmission element is shown once again for better understanding in FIG. 4 in two positions (indicated by solid line and broken line). The force transmission element comprises the spring support 2, which is mounted pivotably around an axis 9. A hole 17, which can be engaged by the guide pin 8, not shown here, in order to establish a pushing/pivoting connection with the unlocking knob, which is not shown here either, is provided on the underside of the spring support 2. The leg spring 1 is clamped in on the lower side between the first spring stop 12 and the second spring stop 13. The leg spring then surrounds the axis 9 and is in contact with the third spring stop 15 under pretension. If the spring support 2 is deflected around the axis 9, it normally carries the leg spring corresponding to the rotation and exerts a pressure on the locking bar 5 to be lifted with the second leg spring arm. It the locking bar 5 is not locked, the transmission of the force brings about an escape of the locking bar 5 and ultimately the unlocking of the automatic shifting device. However, the locking of the locking bar ensures that the locking bar cannot escape. An opposing force F is generated, which ensures, beginning from a certain value, that an elastic deformation of the leg spring 1 will take place and the second leg spring arm 7 remains in this position, while the spring support 2 is deflected around the axis 9.

By selecting the spring strengths of the leg spring correspondingly, it is now possible to prevent destruction in the shifting device due to misactuation of the unlocking knob 4. In addition, the dimensioning of the components can also be made substantially less sturdy because they do not have to be protected from unintentionally strong forces any longer.

On the whole, it is achieved by the present invention that in the case of an intended locking of the gearshift lever, the actuation of the manual actuating element for unlocking the gearshift lever cannot cause destruction in the gearshift lever or in the entire shifting device even under the effect of stronger forces.

It is obvious that the features of the present invention which were mentioned above and are described in the claims are applicable not only in the particular combination described but also in other combinations or alone without going beyond the scope of the present invention.

LIST OF REFERENCE NUMBERS

1 Leg spring
2 Spring support
3 Web
4 Unlocking knob/pusher
5 Pull/push rod/locking bar
6 First leg spring arm
7 Second leg spring arm
8 Pin (guide pin)
9 Axis
10 Groove
11 Stop face for travel limitation
12 First spring stop
13 Second spring stop
14 Shift knob
15 Third spring stop
16 Shifting tube
17 Hole for guide pin

What is claimed is:

1. A shifting device, comprising:

a gearshift lever for an automatic transmission of a motor vehicle, said gear shift lever having a shift knob;

a manual actuating element mounted movably to said shift knob, said gearshift lever being moved in at least one shift gate between two different shift positions and being locked at least partially in one of said shift positions as a function of different vehicle configurations;

an unlocking mechanism for unlocking said gearshift lever with a locking bar and a spring-tensioned force transmission element including a spring support with a pushing and pivoting connection with said actuating element and mounted pivotably about a pivot axis in said shift knob, and a spring braced on said spring support with a first spring arm clamped at two first spring arm sides to said spring support and a second spring arm limited on one side by a spring stop of said spring support and operatively connected to said locking bar for moving said locking bar upon a movement of said manual actuating element when said locking bar is unblocked and such that the manual actuating element can be moved without moving said locking bar when said locking bar is blocked.

2. A shifting device in accordance with claim 1, wherein said spring-tensioned force transmission element is arranged as a connection member between said locking bar and said manual actuating element.

3. A shifting device in accordance with claim 1, wherein said locking bar that can be moved axially with respect to said gearshift lever.

4. A shifting device in accordance with claim 1, wherein said spring is a curved leg spring with said first leg spring arm and said second leg spring arm.

5. A shifting device in accordance with claim 1, wherein said spring is pretensioned with said second spring arm limited by said spring stop.

6. A shifting device in accordance with claim 4, wherein said leg spring of said force transmission element surrounds said axis at least partially.

7. A shifting device in accordance with claim 1, wherein said spring-tensioned force transmission element and said manual actuating element are pivotably connected by engagement of a pin or a roller on one of said spring-tensioned force transmission element and said manual actuating element in a groove or an elongated hole on the other of said spring-tensioned force transmission element and said manual actuating element.

8. A shifting device in accordance with claim 1, wherein said locking bar has a stop or an engagement part connected to said second spring arm.

9. A shifting device, comprising:

a gearshift lever for an automatic transmission of a motor vehicle said gear shift lever having a shift knob;

a manual actuating element connected to said gear shift lever, said gearshift lever being moved in at least one shift gate between two different shift positions and being at least partially lockable in one of said shift positions;

an locking bar connect to said gearshift lever and movable generally in an up and down direction; and a transmission element connecting said manual actuating element to said unlocking mechanism, said transmission element including spring support with a pushing and pivoting connection with said actuating element and mounted pivotably about a pivot axis in said shift knob and a tensioned resilient means with a first spring arm fixed relative to said spring support and a second spring arm limited on one side by a spring stop of said spring support and operatively connected to said locking bar for moving said locking bar upwardly, upon pushing on said manual actuating element when said locking bar is unblocked and for deforming resiliently relative to said locking bar and not moving said locking bar upwardly, upon pushing on said manual actuating element when said locking bar is blocked.

10. A shifting device in accordance with claim 9, wherein said locking bar is movable axially with respect to said gearshift lever.

11. A shifting device in accordance with claim 9, wherein said tensioned resilient means includes a curved leg spring with first leg spring arm braced on said spring support and a second leg spring arm limited by a spring stop on said spring support.

12. A shifting device, comprising:

a gearshift lever for an automatic transmission of a motor vehicle, said gear shift lever having a shift knob, said gearshift lever being moved in at least one shift gate between two different shift positions and being locked at least partially in one of said shift positions as a function of different vehicle configurations;

a manual actuating element mounted to said shift knob for movement relative to said shift knob;

a locking bar movable in an axial direction within said gear shift lever;

a spring support mounted pivotably about a pivot axis element in said shift knob and having a pushing and pivoting connection with said actuating element;

a spring with a first spring arm held relative to said spring support between a first spring stop and a second spring stop and with a second spring arm limited on one side by a third spring stop of said spring support and directly connected to said locking bar and moving said locking bar upon a movement of said manual actuating element when said locking bar is unblocked and deforming resiliently relative to said locking bar and said spring support upon a movement of said manual actuating element when said locking bar is blocked.

13. A shifting device in accordance with claim 12, wherein said spring is a curved leg spying with said first leg spring arm and said second leg spring arm.

14. A shifting device in accordance with claim 12, wherein said spring is pretensioned with said second spring arm limited by said third spring stop.

15. A shifting device in accordance with claim 13, wherein said spring surrounds said pivot axis element at least partially.

16. A shifting device in accordance with claim 12, wherein said locking bar has a stop or an engagement part connected to said second spring arm.

* * * * *